Patented June 30, 1931

1,812,374

UNITED STATES PATENT OFFICE

KURT RIPPER, OF BERLIN, GERMANY

MOLDING COMPOSITION

No Drawing. Application filed March 15, 1928, Serial No. 262,052, and in Austria March 18, 1927.

This invention relates to molding powders and molding compositions made therefrom and to the processes of making such products, the basis of which being the condensation product of dicyandiamide and formaldehyde. This may be used alone or preferably with other resin-forming substances with or without fillers or extending and coloring agents.

The present invention is based primarily on my discovery that by heating dicyandiamide or its appropriate derivatives and formaldehyde or its appropriate derivates for sufficiently long time in a reflux boiler there is formed a hydrophobe tough resin which resin by the action of cold water (or aqueous solutions) is transformed into an extraordinarily fine powder. This powder gives an excellent heat reactive molding powder.

I have also discovered that, if together with dicyandiamide, urea is allowed to react with formaldehyde (in a far less ratio of formaldehyde than would be used if urea alone is allowed to react with formaldehyde for the purpose of obtaining clear condensation products, that is, less formaldehyde than would correspond to 1 mol. of urea to 2 moles of formaldehyde) not only a perfectly water-clear solution of mixed condensation products, but also a highly hydrophobe resin is formed, which resin, when treated with cold water or aqueous solutions disintegrates to a flourlike powder. This powder upon drying, yields an excellent molding powder.

Also with thiourea there is formed a mixed colloid which is precipitated from a clear solution as a hydrophobe resin. This resin, when treated with water or aqueous solutions is also very easily transformed in a flourlike fine molding powder.

Not only the "mixed colloids" which are formed by the condensation with formaldehyde of dicyandiamide and urea or thiourea are by the action of water transformed in a powder, but also it is discovered that the mixed colloids with the products of cresol- or phenol-formaldehyde condensation are transformed into a fine powder by the influence of water at ordinary temperature. This transformation can be accelerated by mechanical means, such as kneading, stirring, beating, and the like.

This latter "mixed colloid" (formed by the condensation of dicyandiamide and phenol- or cresol)—unknown hitherto—is of enormous practical and technical importance, because up to now it was impossible to obtain powderlike, not highly polymerized condensation products of phenol and formaldehyde in a single operation.

It has already been proposed, it is true, to dissolve the resinous initial condensation products of phenol and formaldehyde and to precipitate them by hylotropically acting additions. These processes however have the disadvantage that they are carried out by the action of electrolytes which never can be removed quantitatively from the products.

By the present invention however for the first time there is formed the condensation product of phenol-formaldehyde in the form of a flourlike powder which is absolutely free from electrolytes.

All these powders can be produced in any desired degree of fineness by the aid of the simplest technical means; they can be dried very quickly and can be molded by the combined or separate action of heat and pressure, owing to their good flow under heat and pressure.

By pressing these powders, either shaped articles or blocks, plates, and rods for further mechanical treatment can be produced, as the material, formed by hot pressing, very easily can be bored, cut, sawn, turned, polished, etc.

The invention will be described by the following examples: (not exhausting all possibilities of the new process)

1. 100 parts by weight of dicyandiamide are dissolved in 100 parts by weight of 40% aqueous formaldehyde (which quantities correspond to a ratio of 1 mol. of dicyandiamide to 1 mol. of actual formaldehyde) and the mixture is heated in a reflux boiler. The mixture remains clear like water. The carrying-out of the reactions is controlled by specimens taken out of the boiling mixture. After from 1½ to 2 hours the specimen—when cooled—will show the separation of a hydrophobe, tough, absolutely clear resin. Then the entire reaction-mixture is poured into cold water, and there separates a hydrophobe resin which soon by itself is transformed into a very fine powder. This transformation of the resinlike body into the powderlike state can be accelerated by mechanical means, as by stirring, kneading, beating, and the like.

The powder, having remained in the water for about 24 hours, is then filtered off and washed. After drying, a molding powder of excellent flowing qualities is formed. By pressing it (under the combined action of heat and pressure) water-clear, bright, molded articles are obtained.

2. 100 parts by weight of dicyandiamide together with 71 parts by weight of urea are dissolved in 200 parts by weight of 40% aqueous formaldehyde (which quantities correspond to a ratio of 1 mol. of dicyandiamide, 1 mol. of urea to 2 moles of actual formaldehyde) and heated in a reflux boiler for about 2 hours. The mixture remains water-clear. After about this time a specimen by cooling shows the formation of a highly hydrophobe resin which, when again heated, remains absolutely clear.

The reaction mixture is then poured into cold water and after a short time the transformation of the resin separated into a flourlike powder is finished. After filtering off, washing and drying a molding powder is formed which by the combined action of heat and pressure gives water-clear molded articles.

3. 100 parts by weight of dicyandiamide, 91 parts by weight of thiourea and 200 parts by weight of 40% formaldehyde (by volume) (which quantities correspond to a ratio of 1 mol. dicyandiamide, 1 mol. thiourea, and 2 moles of formaldehyde) are heated in the reflux boiler for about 1½ hours and the solution is then poured into cold water. Similarly to the products described above, there is formed a fine molding powder which by hot pressing can be molded to water-clear shaped articles.

4. 100 parts by weight of dicyandiamide are allowed to react together with 112 parts by weight of phenol on 200 parts of 40% (by volume) of formaldehyde in a reflux boiler, (which quantities correspond to a ratio of 1 mol. dicyandiamide, 1 mol. phenol, and 2 moles formaldehyde). After the mixture has been boiled in the reflux-vessel for about 2½ hours, there are formed two layers. The contents of the vessel are then poured into cold water. The resin solidifies immediately and soon begins the transformation of the solidified resin into a powder. This transformation can be accelerated in the manner and by the mechanical means, as already described above. This powder can be washed and so by the simplest possible way be liberated from any trace of unreacted phenol or other starting or intermediate products. After drying there is formed a molding powder of high flowing qualities, which yields slightly yellowish, transparent, molded articles.

Surprisingly these products are absolutely light-proof.

5. 100 parts by weight of dicyandiamide are allowed to react in the same manner, (as described in the foregoing Example 4) together with 224 parts by weight of phenol and 300 parts by weight of 40% (by volume) of formaldehyde. (These quantities correspond to a ratio of 1 mol. dicyandiamide, 2 moles of phenol and 3 moles of formaldehyde). The reaction is allowed to take place in the same manner as described in Example 4 and, although the quantity of dicyandiamide is reduced, the transformation of the resin formed by the reaction into the state of a fine powder takes place nearly as easily as described in the Example 4.

6. 100 parts by weight of dicyandiamide are allowed to react together with 130 parts by weight of cresol on 200 parts of 40% (by volume) of formaldehyde. (These quantities correspond to a proportion of 1 mol. of dicyandiamide, 1 mol. of cresol, and 2 moles of formaldehyde). In the present example the reaction is finished after heating of only 1 hour in the reflux boiler. The contents of the vessel are poured into cold water and from the separated resin spontaneously there is formed a fine molding powder. This powder by hot pressing can be molded to translucent shaped articles which are much more light-proof than any hitherto known products of similar kind.

All these molding powders may be used alone or—owing to their high flowing qualities—mixed with various organic or mineral fillers or extending agents. If desired lubricants and plasticizing agents or fluxes may be added for the purpose of increasing the flow of the molding composition. As fillers, which increase the mechanical strength of the pressed article, there may be used all fibrous substances of mineral origin, (as e. g. asbestos) cellulose in any form (cottonflock, wood pulp, saw dust, woodflour, cork, flax or the like) and finally fillers of animal origin as wool, silk, leather scrap, etc.

The fillers can be incorporated with the binder before, during or after the transformation of the resin in the state of powder.

The articles pressed from the resin (with or without fillers) can be used industrially for purposes of any kind, for instance insulating material, as substitutes for glass, milk-white glass, porcelain, fancy articles, articles of trinketry, mechanical work-pieces of all descriptions, and the like. These are only a few examples indicating the very extended applicability of the new products.

Instead of the dicyandiamide, derivates of the same, as well as its raw aqueous solutions, can be used. And instead of the formaldehyde, its polymers, as well as other aldehydes, can be used. Finally, instead of the substances able to form with aldehydes, resin-like condensation products, also the initial condensation products of these substances with formaldehyde, as well as methylol-urea and methylol thiourea, phenol or cresyl-alcohols, and the like can be used, in which cases the amount of the formaldehyde may be reduced as compared with the above examples.

I am aware that it had already been proposed to use in the manufacture of solid condensation products suitable for use as substitute for celluloid, horn, glass or the like from formaldehyde and carbamide, as initial substances cyanamide or calcium cyanamide and the like. In this known process the cyanamide or calcium cyanamide is in the course of the reaction in the heat converted into urea by acids or acid salts which are present as condensing agents. Cyanamide is in this manner an equivalent for urea, since it undergoes a treatment resulting in the formation of urea. The condensation product obtained by this known process is a product of the reaction of urea and formaldehyde.

My method differs from the above in that the molding compositions contain a real dicyanamide-formaldehyde condensation product, resulting from the reaction of unaltered dicyandiamide and formaldehyde. No catalysts or condensing agents capable of attacking the dicyandiamide are employed, and no condensing agent is necessary to cause the condensation reactions, as indicated in the examples.

What I claim is:

1. A molding powder comprising a condensation product resulting from the reaction of unaltered dicyandiamide and formaldehyde.

2. A molding powder comprising a mixed condensation product resulting from the reaction of formaldehyde on unaltered dicyandiamide and another compound capable of forming a resinous condensation product with formaldehyde.

3. A molding powder comprising a mixed condensation product resulting from the reaction of formaldehyde on unaltered dicyandiamide and a phenolic body.

4. The process of making a molding powder which comprises reacting on dicyandiamide with formaldehyde in the presence of water whilst applying heat, allowing the reaction to progress until a hydrophobe resinous condensation product has been formed which separates from the reaction mixture when the latter is cooling, bringing a watery liquid into contact with such condensation product, permitting the so-treated product to stand until conversion into a fine powder has taken place, separating such powder from the bulk of the remaining liquid, and drying it.

5. The process of making a molding powder which comprises reacting under heat on dicyandiamide with formaldehyde in the presence of water and in contact with a catalyst exercising catalytic actions without attacking the dicyandiamide, allowing the reaction to proceed until a hydrophobe resinous condensation product has been formed which separates from the reaction mixture when the latter is cooling, bringing a watery liquid into contact with such condensation product, permitting the so-treated product to stand until conversion into a fine powder has taken place, separating such powder from the bulk of the remaining liquid, and washing and drying it.

6. The process of making a molding powder which comprises reacting on dicyandiamide with formaldehyde in the presence of water whilst applying heat, allowing the reaction to progress until a hydrophobe resinous condensation product has been formed which separates from the reaction mixture when the latter is cooling, bringing a watery liquid into contact with such condensation product, permitting the so-treated product to undergo conversion into a fine powder whilst promoting such conversion by mechanical treatment such as kneading, stirring, beating and the like, separating such powder from the bulk of the remaining liquid, and washing and drying it.

7. The method of making a molding powder which comprises dissolving dicyandiamide in a watery solution of formaldehyde, heating the so prepared solution in a boiler with a reflux condenser until a hydrophobe resinous condensation product has been formed, precipitating the said condensation product by pouring the whole of the reaction mass into cold water, allowing a fine powder to form in the mixture from the said condensation product, separating such powder from the bulk of the remaining liquid, and drying it.

8. The method of making a molding powder which comprises dissolving dicyandiamide in a watery solution of formaldehyde, adding a catalyst exercising catalytic actions without attacking the dicyandiamide, heating the so prepared solution in a boiler with a reflux condenser until a hydrophobe resinous condensation product has been formed, precipitating the said condensation product by pouring the whole of the reaction mass into cold water, allowing a fine powder to form in the mixture from the said condensation product, separating such powder from the bulk of the remaining liquid, and washing and drying it.

9. A process of the general character defined in claim 4, in which the reaction is started with a solution containing dicyandiamide and formaldehyde in a ratio which corresponds to 1 molecule of dicyandiamide to 1 to 2.5 molecules of formaldehyde.

10. A process of making a molding powder, which comprises producing a mixed condensation product by reacting with formaldehyde under heat upon dicyandiamide in combination with another compound capable of forming with formaldehyde a resinous condensation product, whilst allowing the reaction to proceed until a hydrophobe resinous reaction product has been formed, which separates from the reaction mixture on cooling, bringing a watery liquid into contact with such condensation product, permitting the so treated product to undergo conversion into a fine powder, separating such powder from the bulk of the remaining liquid and washing and drying it.

11. The process of making a molding powder which comprises reacting on dicyandiamide and a phenolic body with formaldehyde in the presence of water whilst applying heat, allowing the reaction to proceed until separation of the liquid mixture into two superposed layers takes place, pouring the whole of the reaction mass into cold water, permitting the mixture to stand until conversion of a precipitating solid resin into a fine powder has taken place, separating such powder from the bulk of the remaining liquid, and washing and drying it.

12. A process of the general character defined in claim 11, in which the reaction is started with a solution containing dicyandiamide, a phenolic body and formaldehyde in a ratio which corresponds to 1 molecule of dicyandiamide, 2 molecules of the phenolic body and 3 molecules of formaldehyde.

13. The process of making a molding powder which comprises reacting under heat on dicyandiamide and a phenolic body with formaldehyde in the presence of water and in contact with a catalyst exercising catalytic properties without attacking the dicyandiamide, allowing the reaction to proceed until separation of the liquid mixture into two superposed layers takes place, pouring the whole of the reaction mass into cold water, permitting the mixture to stand until conversion of a precipitating solid resin into a fine powder has taken place, separating such powder from the bulk of the remaining liquid, and washing and drying it.

14. A molding powder obtained by producing a hydrophobe resinous condensation product by reacting with formaldehyde upon unaltered dicyandiamide, followed by a treatment of the so formed hydrophobe resinous condensation product with a watery liquid to convert the said product into a flour-like fine powder free from electrolytes.

15. A molding powder obtained by producing a hydrophobe resinous condensation product by reacting with formaldehyde upon unaltered dicyandiamide in combination with another compound capable of forming with formaldehyde a resinous condensation product, followed by a treatment of the so formed resinous condensation product with a watery liquid to convert the said product into a flour-like fine powder free from electrolytes.

16. A molding powder obtained by producing a hydrophobe resinous condensation product by reacting with formaldehyde upon unaltered dicyandiamide and a phenolic body, followed by a treatment of the so formed resinous condensation product with a watery liquid to convert the said product into a flour-like fine powder free from electrolytes.

17. A molded product obtained by treatment under heat and pressure of a molding powder, comprising a condensation product resulting from the reaction of unaltered dicyandiamide and formaldehyde.

In testimony whereof I affix my signature.

KURT RIPPER.